United States Patent
Takachi et al.

[11] Patent Number: 6,098,477
[45] Date of Patent: Aug. 8, 2000

[54] CRANK DEVICE FOR LINEAR MOTION OF CONNECTING ROD

[75] Inventors: Ken Takachi, Nishinomiya; Shuji Ogai, Miyakojima-ku, both of Japan

[73] Assignee: Longwell Japan Co., Ltd., Osaka-fu, Japan

[21] Appl. No.: 09/177,802

[22] Filed: Oct. 23, 1998

[51] Int. Cl.⁷ .................................................. F16H 37/12
[52] U.S. Cl. .................................................. 74/52; 74/50
[58] Field of Search .................................. 74/50, 52, 25; 475/331, 344, 180

[56] References Cited

U.S. PATENT DOCUMENTS

| | | | |
|---|---|---|---|
| 399,492 | 3/1889 | Burke | 74/25 |
| 634,194 | 10/1899 | Woodward | 74/25 |
| 1,210,861 | 1/1917 | Sitney | 475/331 |
| 3,693,464 | 9/1972 | Wieckmann | 74/52 |
| 3,886,805 | 6/1975 | Koderman | 74/52 |
| 3,990,325 | 11/1976 | Bueren | 74/52 |

FOREIGN PATENT DOCUMENTS

| | | |
|---|---|---|
| 52-154919 | 12/1977 | Japan . |
| 54-113775 | 9/1979 | Japan . |
| 62-182442 | 10/1987 | Japan . |
| 10-121981 | 5/1998 | Japan . |

*Primary Examiner*—David M. Fenstermacher
*Attorney, Agent, or Firm*—Arent Fox Kintner Plotkin & Kahn, PLLC

[57] ABSTRACT

A crank device performs power conversion between reciprocal movement and rotational movement using a planetary gear mechanism without causing inclination of a connecting rod. An internally toothed sun gear is spaced a predetermined distance from the connecting rod. A planetary gear as well as a planetary gear shaft secured at one end of the planetary gear are rotatably received within a crank member. An arm portion is formed on the other end of the planetary gear shaft and extends radially outwardly a distance corresponding to the radius of the pitch circle of the planetary gear. One end of the connecting rod is pivotably connected to the forward end of the arm portion. A pair of bearings rotatably support the opposite ends of the planetary gear shaft and are disposed at spaced positions within the crank member. One of the bearings is arranged adjacent to the connecting rod.

3 Claims, 5 Drawing Sheets

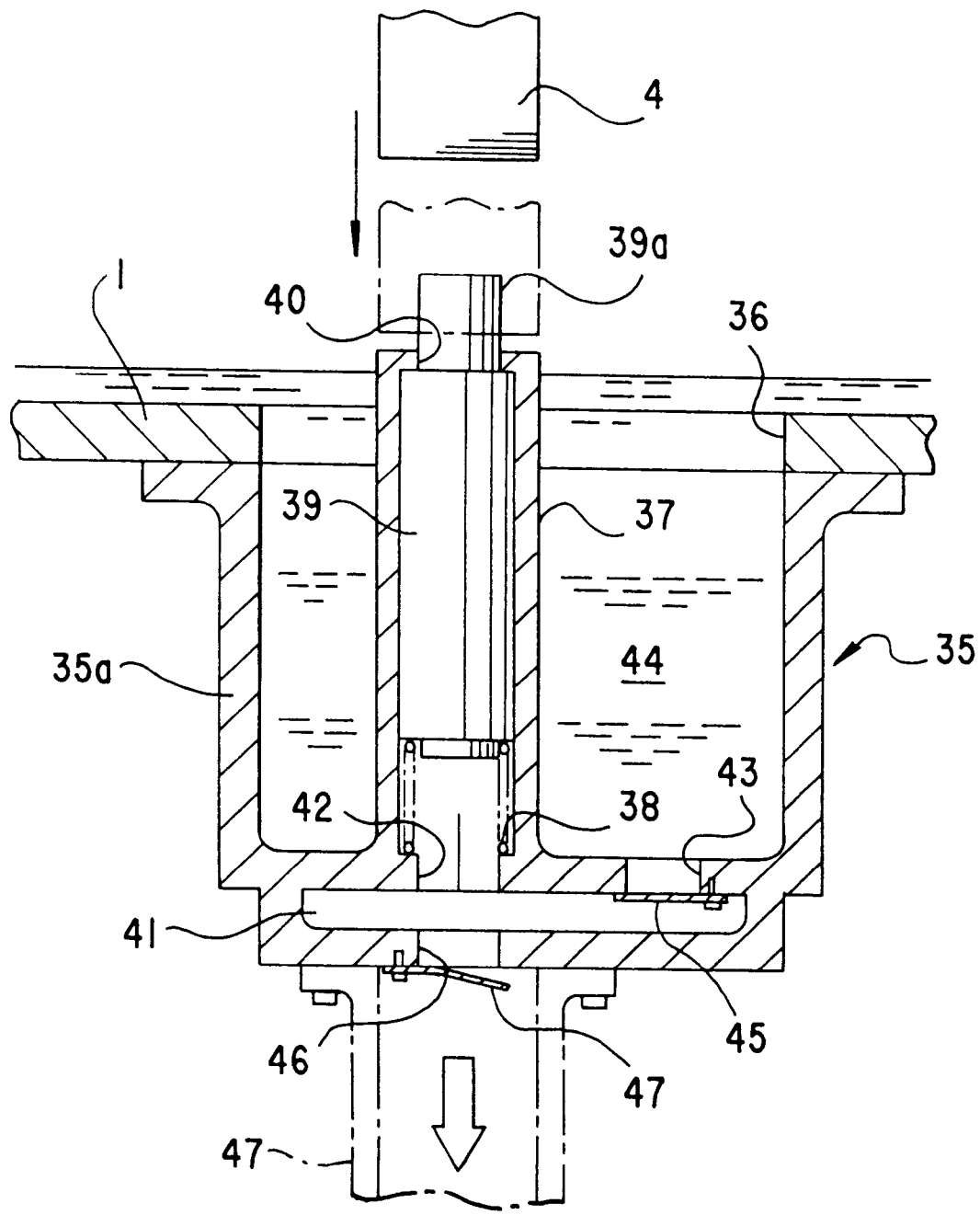

CRANK DEVICE FOR LINEAR MOTION OF CONNECTING ROD

FIELD OF THE INVENTION

The invention relates to a crank device for performing power conversion between reciprocal movement and rotational movement using a planetary gear mechanism, without causing inclination or tilt of a connecting rod.

BACKGROUND OF THE INVENTION

A crank device of this kind using a planetary gear mechanism has been known in the art. For example, Japanese Patent Public Disclosure No. 54-113775 (Japanese Patent Publication No. 62-20414) discloses a non-vibrational, single-cylinder four-cycle reciprocating engine. In the disclosed engine, a connecting rod is linearly reciprocated by means of a planetary gear mechanism disposed on one side of the connecting rod, so as to prevent occurrence of vibrations due to the oscillational movement of the connecting rod.

In a two-cycle engine disclosed in Japanese Patent Public Disclosure No. 52-154919, or an internal combustion engine of a hypo-cycloid crank type, a pair of left hand and right hand planetary mechanisms are disposed on opposite sides of a connecting rod. Left hand and right hand planetary gears are connected at a position on the pitch circle thereof is connected by a shaft. The connecting rod is pivotably connected, at its lower end portion, to the shaft at its central portion.

It is noted that, in the non-vibrational reciprocating engine disclosed in the above-mentioned Japanese Patent Public Disclosure No. 54-113775, the lower end portion of the connecting rod is formed into an annular portion of a larger diameter. A member, called an eccentric collar, integral with the planetary gear is rotatably fitted within the inner diameter of the annular portion. This construction involves problems including, for example, increase in weight due to the larger annular portion, increase in size of an engine, increase in friction loss between the eccentric collar and the annular portion, and increase in cost for manufacturing the larger annular portion and the eccentric collar.

It is also noted that, in the two-cycle engine disclosed in Japanese Patent Public Disclosure No. 52-154919, or the internal combustion engine of a hypo-cycloid crank type, it is not assured that the left hand and right hand planetary gears are revoluted along the inner periphery of the internally toothed sun gear in accurately synchronized fashion. The shaft connecting the left hand and right hand planetary gears tends to be slightly inclined toward the internal periphery of the internally toothed sun gear, so as to cause a "locked phenomenon" due to the interference between the planetary gear and the internally toothed sun gear. Once the "locked phenomenon" has occurred, the engine is no longer capable of rotating, so that the engine cannot be started, unless the engine is dis-assembled and re-assembled.

SUMMARY OF THE INVENTION

The main object of the invention is to provide a crank device which does not require the above-mentioned larger annular portion at the lower end portion of the connecting rod, and which prevents the "locked phenomenon" of the planetary gear mechanism.

In order to overcome the above-mentioned problems, the invention provides a crank device which comprises a planetary gear mechanism interposed between a crank member which is rotatably supported by a housing and connected to a rotation side and a connecting rod which is connected to a reciprocation side movable in a direction perpendicular to the rotation axis of the crank member, the planetary gear mechanism including an internally toothed sun gear fixedly mounted on the housing in concentric with the rotational axis of the crank member, and a planetary gear capable of rolling along the inner periphery of the internally toothed sun gear, the pitch circle diameter of the planetary gear being selected to be one half of the pitch circle diameter of the sun gear, the rotation center of the planetary gear being supported at a position offset from the rotational axis of the crank member, one end of the connecting rod is pivotably connected at a position on the pitch circle of the planetary gear, whereby the connecting rod, as a whole, is adapted to be linearly reciprocated along a direction perpendicular to the rotational axis of the crank member, while performing power conversion between reciprocal movement and rotational movement, the internally toothed sun gear being spaced a predetermined distance from the connecting rod, the crank member being extended through the internally toothed sun gear, the planetary gear, as well as a planetary gear shaft connected at one end to the planetary gear, being rotatably received within the crank member, the teeth of the planetary gear being meshed with the teeth of the internally toothed sun gear through a notch formed in the outer periphery of the crank member, the other end of the planetary gear shaft being exposed from the end of the crank member facing the connecting rod, the other end of the planetary gear shaft being formed with an arm portion extending radially outwardly a distance corresponding to the radius of the pitch circle of the planetary gear, the one end of the connecting rod being pivotably connected to the forward end of the arm portion, and a pair of spaced bearings for rotatably supporting the opposite ends of the planetary gear shaft being disposed within the crank member, one of the bearings being disposed adjacent to the connecting rod as closely as possible.

Due to the above-mentioned construction, the spacing between the pair of bearings for the planetary gear shaft may be increased, so that the planetary gear shaft may be supported in a more stable manner. Furthermore, undue bending force is not exerted on the planetary gear shaft, since one of the bearings is disposed adjacent to the connecting rod as closely as possible. Thus, power conversion between reciprocal movement and rotational movement may be performed in a smooth manner.

In accordance with the invention, the planetary gear shaft may be stably supported as mentioned above. Thus, the connecting rod may be supported in a cantilever fashion by means of the single planetary gear shaft or the single crank member, thus simplifying the construction of the crank device. It is also noted that the invention may be applicable to a construction in which a pair of planetary gear mechanisms are disposed on opposite sides of the connecting rod. In this case, a larger amount of power conversion may be smoothly performed thanks to the construction in which the planetary gear shaft is stably supported as mentioned above.

In order to provide more stable support for the planetary gear shaft, a first balance weight portion having a predetermined thickness is formed on the crank member at the end thereof facing the connecting rod, for the purpose of achieving balancing in the rotational direction. The arm portion is arranged in a recess having a depth within the limit of the thickness of the first balance weight portion.

In order to provide further stable support for the planetary gear shaft, a second balance weight portion is formed on the other end of the planetary gear shaft. The second balance weight portion extends in a direction opposite to the direction in which the arm portion extends. The second balance weight portion is arranged in a recess having a depth within the limit of the thickness of the first balance weight portion.

By providing the arm portion and/or the second balance weight portion in the recess in the first balance weight portion, as mentioned above, the connecting rod may be disposed most closely to the end wall of the crank member, whereby the spacing between the bearings for the connecting rod and the planetary gear shaft may be further reduced in an advantageous manner. As a result, bending force acting on the end of the planetary gear shaft may be minimized, so that the planetary gear shaft is stably supported.

BRIEF DESCRIPTION OF THE DRAWINGS

For a fuller understanding of the nature and objects of the present invention, reference should be had to the following detailed description taken in connection with the accompanying drawings wherein:

FIG. 6 is a cross-sectional view showing an oil pump.

DETAILED DESCRIPTION OF THE PREFERRED EMBODIMENTS

Figure 1A:
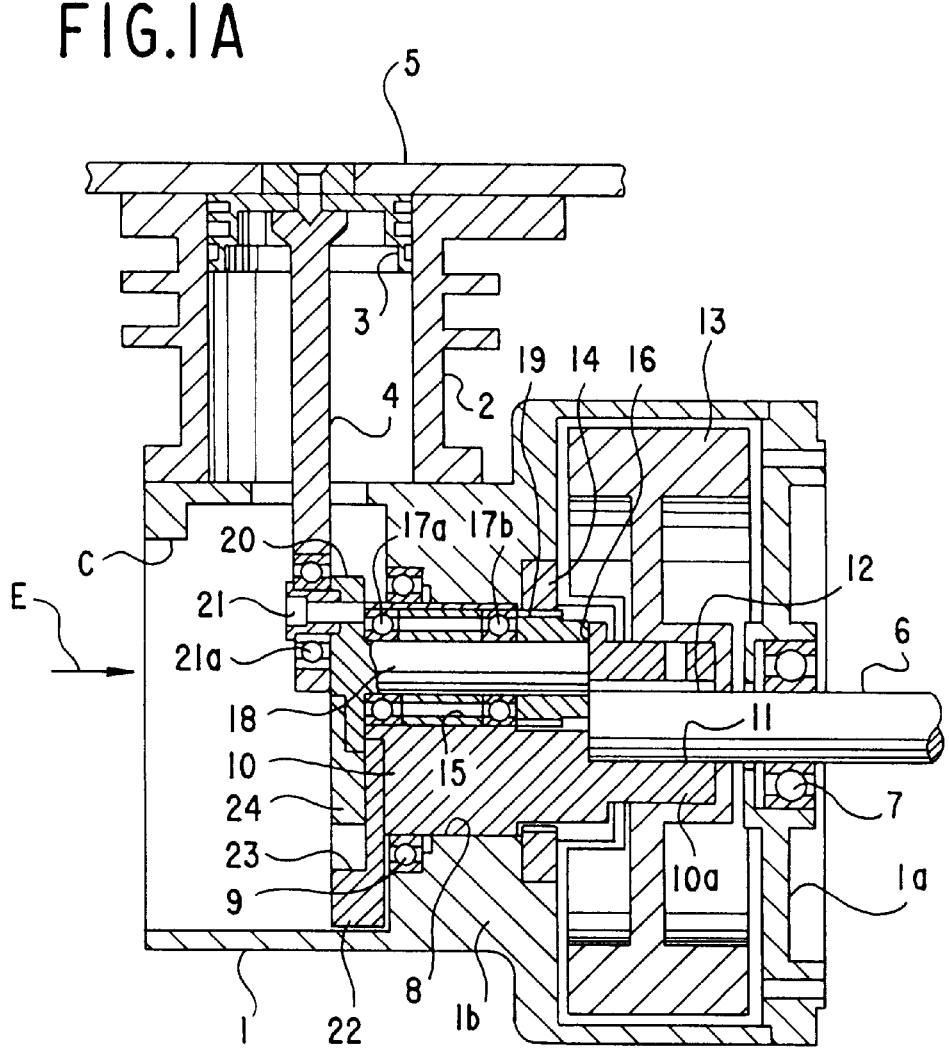
FIG. 1A is a longitudinal sectional view showing an air compressor according to one embodiment of the invention.

One embodiment in accordance with the invention will be explained below with reference to the drawings. FIG. 1A schematically shows an air compressor. In FIG. 1A, reference numeral 1 designates a housing, 2 a cylinder portion, 3 a piston, 4 a connecting rod integral with the piston, S a head plate, and 6 an input shaft. A pair of check valves (not shown) are disposed on the upper surface of the head plate 5 at the intake side and the exhaust side respectively. The pair of check valves are constructed so as to cause a quantity of air withdrawn in the cylinder from the atmosphere to be compressed in the piston 3 and to be discharged therefrom. In the illustrated embodiment, the piston 3 is reciprocated by means of an external drive source through the input shaft 6.

An end partition 1a is formed at one end of the housing 1. The forward end of the input shaft 6 is inserted into and supported by a bearing 7 disposed at the central portion of the end partition. A central partition 1b is formed at the central portion of the housing 1. A relatively larger bore 8 is formed at the central portion of the central partition 1b, The relatively larger bore 8 extends through the central partition 1b in the left-right direction (longitudinal direction).

Figure 1B:
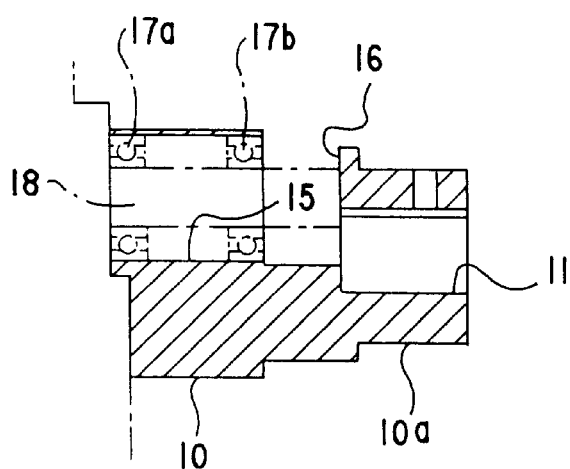
FIG. 1B is a cross-sectional view showing a crank member.
Figure 1C:
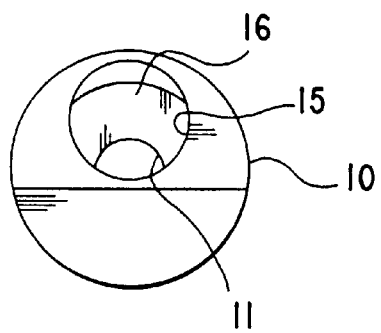
FIG. 1C is a side elevational view as viewed from the left-hand side in FIG. 1B.

Another bearing 9 is fitted within the central portion of the central partition 1b at one longitudinal end thereof. A crank member 10, of an integral construction as shown in FIGS. 1B and 1C, is inserted into the bore 8. The crank member 10 is rotatably supported by means of the bearing 9.

The forward end of the input shaft 6 is fitted within a bore 11 which is drilled through one end surface of a boss 10a at one end of the crank member 10. The forward end of the input shaft and the boss 10a are secured together by means of a key 12 so that they are integrally driven in a rotational direction. A flywheel 13 is fitted around the outer periphery of the boss 10a.

An internally toothed sun gear 14 is fixedly fitted within one end of the central partition 1b. The crank member 10 is formed with a bore 15 having a longitudinal axis which is in parallel with and offset from the rotational axis. The deepest portion of the bore 15 extends to the backface of the boss 10a. A notch 16 in communication with the bore 15 is formed so as to be arranged in opposed relationship with the inner periphery of the internally toothed sun gear 14. The left hand end of the bore 15 adjacent to the connecting rod 4 is opened.

A pair of left hand and right hand bearings 17a and 17b are disposed within the bore 15 of the crank member 10. A shaft 18 for a planetary gear is rotatably supported by the pair of bearings 17a and 17b. A planetary gear 19 is fixedly fitted over the planetary gear shaft 18 at its right hand end. A portion of the teeth of the planetary gear 19 is mashed with the internally toothed sun gear 14 through the notch 16.

The opposite end or right hand end of the planetary gear shaft 18 is slightly protruded outwardly toward the connecting rod 4. An arm portion 20, which extends in a radially outward direction, is mounted on the protruded end of the planetary gear shaft 18. The forward end of the arm portion 20 is connected with the lower end of the connecting rod 4 through a bearing 21a by means of a pin 21 mounted so as to be coincident with the pitch circle of the planetary gear 19 as viewed from the left hand direction (shown by an arrow mark E) on FIG. 1.

A first balance weight portion 22 is formed on the crank member 10 at one side thereof opposite to the bore 15. The first balance weight portion 22 is configured into a sector, as viewed from the direction indicated by the arrow mark E on FIG. 1, having a predetermined thickness. A recess 23 is formed in the first balance weight portion 22 at a radially inward portion thereof. A second balance weight portion 24 is formed on the planetary gear shaft 18 at the left hand end thereof. The second balance weight portion 24 extends in a radial direction opposite to the direction in which the arm portion 20 extends. The second balance weight portion 24 and the arm portion 20 are so arranged that they are accommodated within the recess 23.

With the crank device as constructed in accordance with the above, and when the input shaft 6 is rotated, the crank member 10 is rotated integrally with the input shaft 6. By this, the planetary gear 19 is revolved along the inner periphery of the internally toothed sun gear 14 while rotating around its own rotational axis. Thus, the pin 21 attached to the arm portion 20 disposed at one ondefthe planetary gear shaft 18 is reciprocated in the vertical direction along a line extended from the center line of the cylinder 2 and the piston 3. Consequently, the connecting rod 4 connected with the pin 21 is reciprocated in the vertical direction along a linear line, without causing any inclination or tilt. By this, a quantity of air within the cylinder 2 is compressed therein and discharged therefrom to the atmosphere, without causing any lateral pressure between the outer periphery of the piston 3 and the inner periphery of the cylinder 2 which might be caused when the connecting rod 4 is inclined or tilted. It is noted that, since the planetary gear shaft 18 is supported by the pair of bearings 17a and 17b in a stable manner, and the connecting rod 4 is disposed closely adjacent to one 17a of the bearings, no undue bending force will be exerted to the end of the planetary gear shaft 18. Thus, power conversion from rotational movement to recipocal movement may be performed in a smooth manner.

It is also noted that, due to the linear reciprocal movement without no inclination of the connecting rod 4, together with reduced bending force on the planetary gear shaft 18, a load acting on the housing 1 may be reduced. By this, reduction in thickness of the housing 1, for example, may be achieved.

It is also noted that the end partition 1a and the opposite end of the housing 1 of the crank device are constructed so as to provide a cantilever support construction in which the crank member 10 is supported by the bearings 17a and 17b. Accordingly, no additional bearings are needed. Thus, an inspection hole C formed in the housing 1 may be closed, for example by a transparent plastic plate, so that a quantity of oil may be accumulated within an inner bottom portion of the housing 1. By this construction, the state within the crank device may be visually inspected, as desired, and maintenance work for the crank device may be easily performed.

Figure 2:
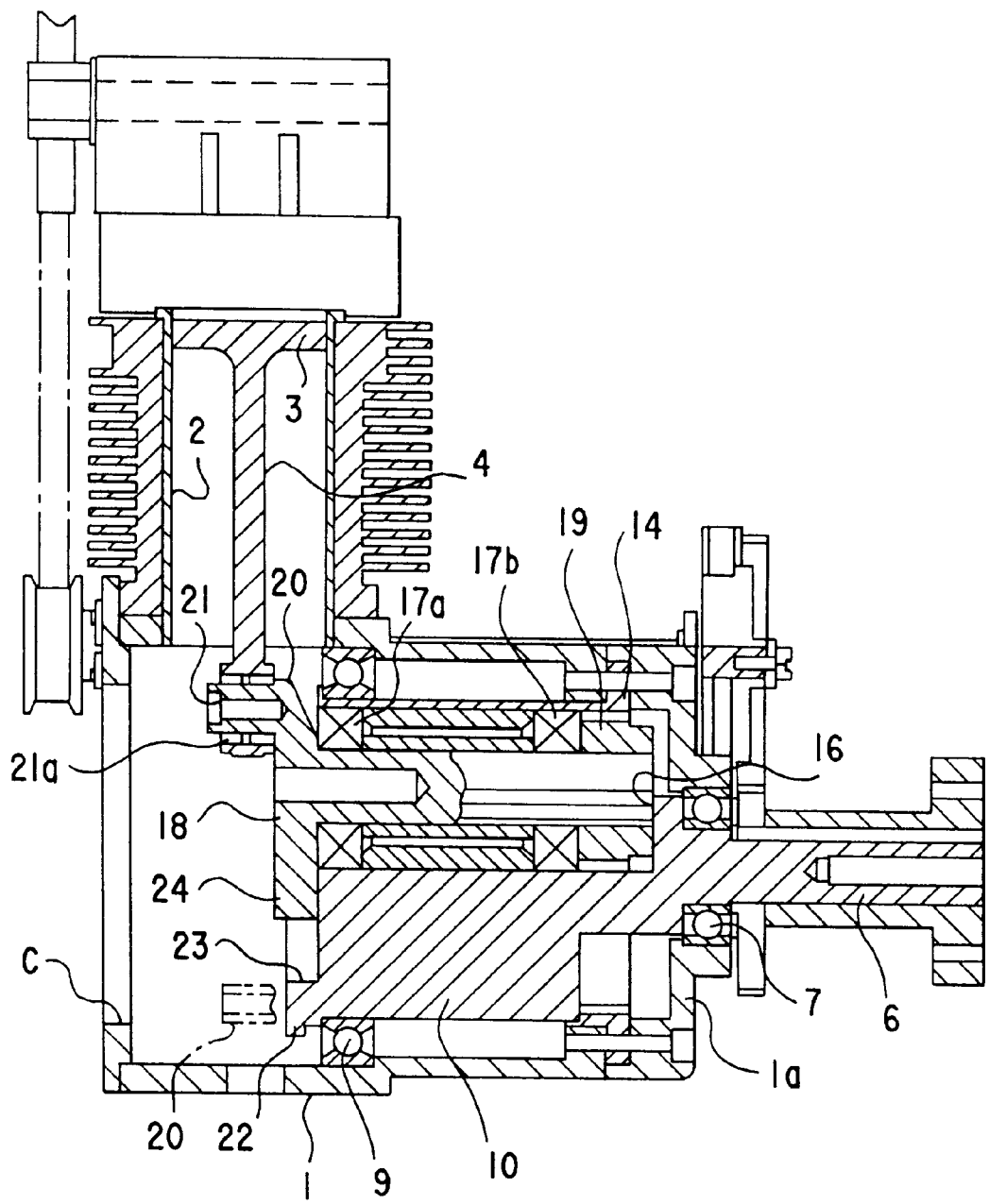
FIG. 2 is a schematic cross-sectional view showing a four-cycle internal combustion engine according to another embodiment of the invention.

The above-mentioned embodiment is obtained when the invention is applied to a compressor. It is noted, however, that the invention may also be applied to an internal combustion engine. FIG. 2 is a schematic view illustrating a four-cycle internal combustion engine. This internal combustion engine is basically of a construction substantially the same as that shown in FIG. 1, except the fact, for example, that the input shaft 6 is formed integrally with the crank member 10, and that the central partition 1b is omitted.

Figure 3:
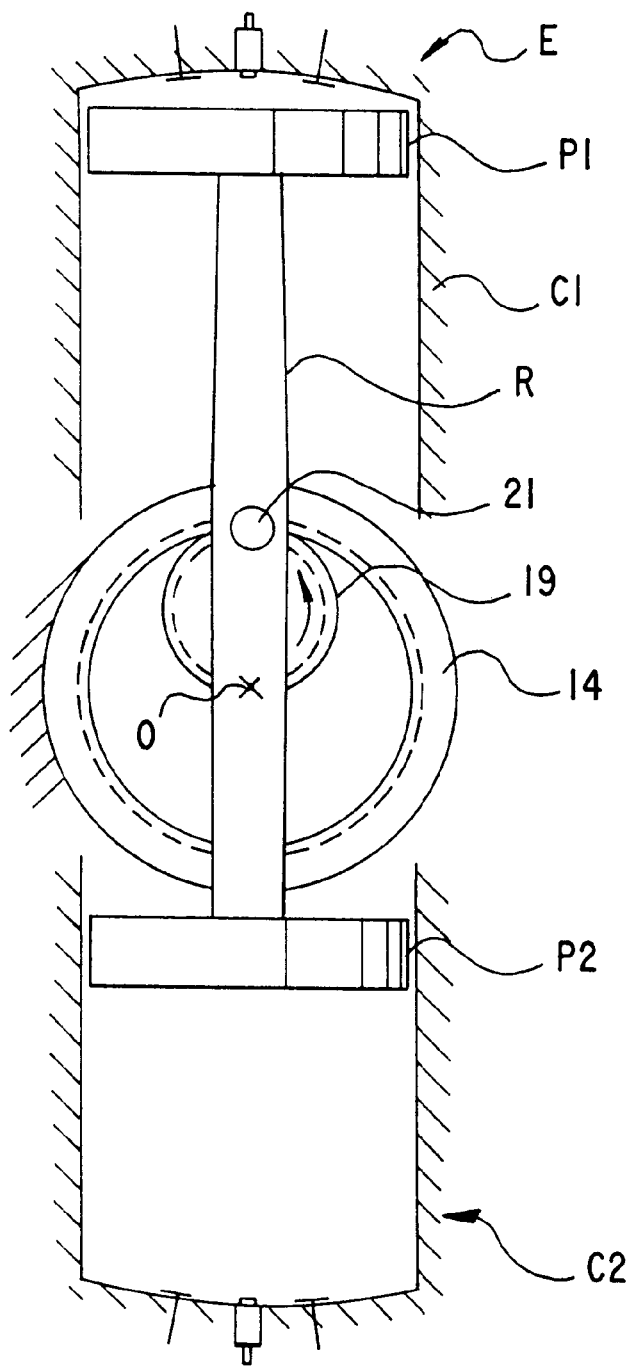
FIG. 3 is a schematic cross-sectional view showing a horizontal opposed type internal combustion engine.
Figure 4:
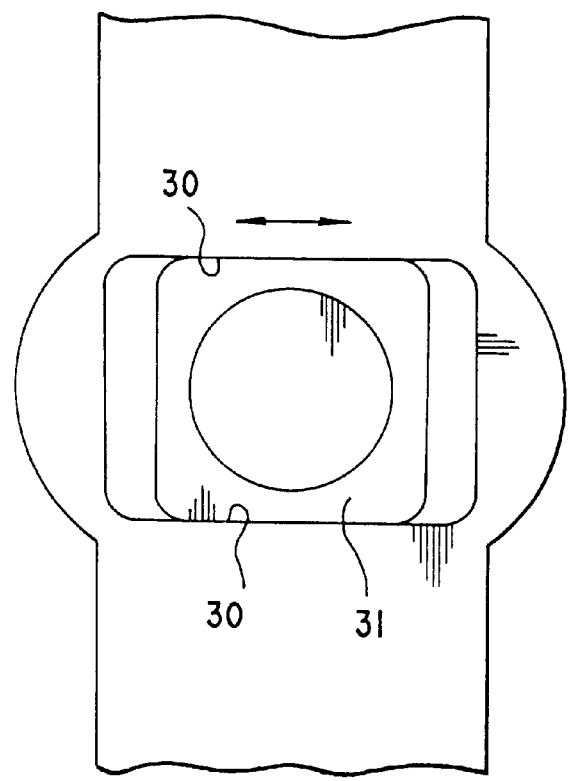
FIG. 4 is an enlarged view showing an intermediate portion of a connecting rod.

In an internal combustion engine E in which a pair of cylinders C1 and C2 are oppositely disposed with each other, as shown in FIG. 3, a pair of pistons P1 and P2 are connected together by means of a connecting rod R. A planetary gear 19 is pivotably connected, at its predetermined position on the pitch circle of the planetary gear 19, to the connecting rod R at its intermediate position by means of a pin 21. The construction of the planetary gear Is similar to that shown in FIG. 1.

Since backlash is present between the planetary gear 19 and the internally toothed sun gear, the planetary gear 19 will catch on the teeth of the sun gear by its right hand teeth within the gap of the backlash, when the planetary gear 19 is rotated from the position shown in FIG. 3 toward a right hand and downward direction in FIG. 3. On the contrary and when the planetary gear 19 is rotated from the bottom position to a left hand and upward direction in FIG. 3, the planetary gear 19 will catch on the teeth of the sun gear by its left hand teeth within the gap of the backlash. Thus, the planetary gear 19 is displaced toward the right as viewed in FIG. 3, when it is on the right hand half of the internally toothed sun gear, while the planetary gear 19 is displaced toward the left as viewed in FIG. 3, when it is on the left hand half of the internally toothed sun gear. Accordingly, undue force might be undesirably exerted on the piston P1 and P2 and the planetary gear 19, when the pin 21 is pivotably connected to the connecting rod R at a fixed position.

In order to avoid the above-mentioned disadvantage, a pair of parallel guide grooves 30 and 30 are formed in the connecting rod R at its central portion, the parallel guide grooves 30 and 30 extending in a direction perpendicular to the direction in which the connecting rod R extends. A carrier 31 of a rectangular configuration is placed in the guide grooves 30 and 30. The carrier 31 may be moved in the left hand and right hand direction with its upper and lower edges being engaged with the grooves. The pin 21 is pivotably connected to the carrier 31. When the planetary gear 19 is repetitively displaced in offset manner to the right or the left, such offset may be accommodated by the carrier 31. Thus, no undue force will be exerted on the pistons P1 and P2 and the planetary gear 19. Accordingly, wearing for the pistons P1 and P2, the cylinders C1 and C2 and the planetary gear 19 and the internally toothed sun gear 14 may be reduced.

Figure 5:
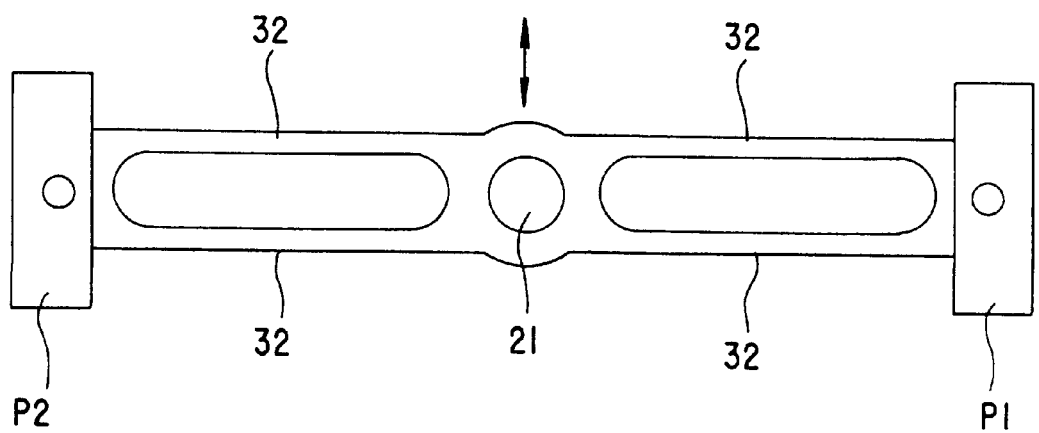
FIG. 5 is a side elevational view showing a modified connecting rod.

The above-mentioned construction, which permits left hand and right hand movement of the planetary gear 19, may be formed by a pair of thin-walled webs 32 which permits the connecting rod R to be resiliently deformed in the direction shown by the arrow mark in FIG. 5, rather than using the above-mentioned carrier 31, in a case when the crank device is used, for example, in a vacuum pump in which significant compression load is not applied to the connecting rod R.

The invention may be used, for example, to form an oil pump 35 as shown in FIG. 6, by utilizing the feature of producing a linear reciprocal movement of the connecting rod R shown in FIG. 1. Such an oil pump is practically of a great value when used in a relatively smaller engine, since it has a simple construction.

More particularly, a bore 36 is formed in the bottom wall of the housing 1 of the crank device. A casing 35a of an oil pump 35 is attached to the housing 1 in alignment with the bore 36. The casing 35a is of a cylindrical form having its bottom wall. A cylinder portion 37 is protruded upwardly from the bottom wall at its central portion. A piston 39 is disposed within the cylinder portion 37. The piston 39 is biased upwardly by means of a spring 38. The upper end portion 39a of the piston 39 protrudes from the upper bore 40 of the cylinder portion 37 to a position slightly above the bottom wall of the housing 1. The bottom wall of the casing 35a is of a double construction consisting of an upper wall and a lower bottom wall. An oil chamber 41 is defined between the upper and lower bottom walls. The oil chamber 41 is in fluid communication with the cylinder portion 37 through a first communication port 42 in the upper bottom wall. The oil chamber 41 is also in communication with an oil reservoir 44 outside the cylinder portion 37 through a second communication port 43. A first chock valve 45 is disposed below the second communication port 43, so as to prevent back flow of oil from the oil chamber 41 into the oil reservoir 44. An oil discharge port 46 is formed in the lower bottom wall of the casing 35a. A second check valve 47 is disposed below the oil discharge port 46. An oil conduit 48 is coupled to the oil discharge port 46 for directing oil to predetermined lubrication points of the crank device.

In operation of the oil pump 35, the connecting rod 4 is moved up and down in the vertical direction. When the connecting rod 4 is lowered to the bottom dead center, it strongly strikes instantaneously on the upper end portion 39a of the piston of the oil pump 35, so as to cause the piston 39 to be moved down against the action of the spring 38. By this, the first check valve 45 is closed, and the oil within the cylinder portion 37 is compressed by the piston 39, so as to be supplied under pressure into the oil conduit 48 through the second check valve 47.

Since the lower end portion of the connecting rod 4 strikes vertically on the upper end portion of the piston 39 with a greatest force exerted at the lower-most position of the connecting rod 4, oil is transferred under pressure by the piston 39 at a maximum efficiency. It is also noted that the lower end portion of the connecting rod 4 and the upper end portion of the piston may be prevented from wearing. Moreover, occurrence of abnormal sound or noise can be minimized.

In accordance with the invention, one of the pair of bearings for supporting the planetary gear shaft is disposed closely adjacent to the connecting rod, while the other of the pair of bearings is spaced from the one bearing. By this, it is possible for the planetary gear shaft to be supported in stable manner. It is also possible for the connecting rod to be supported in a cantilever fashion by means of a single planetary gear shaft or a single crank member, whereby the construction is simplified.

When a pair of planetary gear mechanisms are disposed in a symmetrical fashion on opposite sides of the connecting rod, a greater amount of power conversion may be advantageously performed in a smooth manner, while, at the same time, providing more stable support for the planetary gear shaft. In this case, a first gear is integrally mounted on the left and right crank members, and a second gear is secured to a counter shaft arranged in parallel with the crank member, so that the first and second gears are meshed with each other, for the purpose of accurately synchronizing rotation movement of the left and right crank members.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

What is claimed is:

1. A crank device comprising a planetary gear mechanism interposed between and connected to a rotating crank member which is rotatably supported by a housing and a connecting rod which is movable in a reciprocating direction perpendicular to a rotational axis of the crank member, wherein the planetary gear mechanism includes an internally toothed sun gear fixedly mounted on the housing coaxial with the rotational axis of the crank member, and a planetary gear capable of rolling along an inner periphery of the internally toothed sun gear, a pitch circle diameter of the planetary gear being selected to be one half of a pitch circle diameter of the sun gear, a pitch circle diameter of the sun gear, a rotation center of the planetary gear being supported at a position offset from the rotational axis of the crank member, the connecting rod is pivotably connected at a position on the pitch circle of the planetary gear, whereby the connecting rod, as a whole, is adapted to be linearly reciprocated along the direction perpendicular to the rotational axis of the crank member, which converts reciprocal movement to rotational movement;

the internally toothed sun gear being spaced a predetermined distance from the connecting rod, a portion of the crank member extends through the pitch circle of the internally toothed sun gear, the planetary gear and a planetary gear shaft connected at one end of the planetary gear are rotatably received within the crank member, the teeth of the planetary gear being meshed with the teeth of the internally toothed sun gear through a notch formed in an outer periphery of the crank member, the planetary gear shaft is disposed within a bore of the crank member with the other end of the planetary gear shaft protruding from an end of the bore of the crank member facing the connecting rod and is formed with an arm portion extending radially outwardly a distance corresponding to a radius of the pitch circle of the planetary gear, the one end of the connecting rod being pivotably connected to a forward end of the arm portion, and a pair of spaced bearings rotatably support opposite ends of the planetary gear shaft disposed within the crank member, one of the bearings being disposed adjacent to the connecting rod.

2. A crank device according to claim 1, wherein a first balance weight portion having a predetermined thickness is formed on the crank member at the end thereof facing the connecting rod, for the purpose of achieving balancing in the rotational direction, and wherein the arm portion is arranged in a space having a depth within the limit of the thickness of the first balance weight portion.

3. A crank device according to claim 2, wherein a second balance weight portion is formed on the other end of the planetary gear shaft, the second balance weight portion extending in a direction opposite to the direction in which the arm portion extends, the second balance weight portion being arranged in a space having a depth within the limit of the thickness of the first balance weight portion.

* * * * *